(12) United States Patent
Kipfer

(10) Patent No.: US 7,157,109 B2
(45) Date of Patent: Jan. 2, 2007

(54) NATURAL RE-HYDRATING AND ENERGIZING BEVERAGE BASED ON COCONUT WATER, FRUIT JUICES AND INCORPORATED NUTRITIVE COMPONENTS

(76) Inventor: Marc Kipfer, Bungertweg 2, Küsnacht, Zurich (CH) CH 8700

( * ) Notice: Subject to any disclaimer, the term of this patent is extended or adjusted under 35 U.S.C. 154(b) by 500 days.

(21) Appl. No.: 10/651,799

(22) Filed: Aug. 29, 2003

(65) Prior Publication Data

US 2004/0047968 A1    Mar. 11, 2004

(30) Foreign Application Priority Data

Sep. 5, 2002    (BR)    .................................. 0203591

(51) Int. Cl.
- A23L 2/00 (2006.01)
- A23L 2/08 (2006.01)
- A23L 2/46 (2006.01)

(52) U.S. Cl. ...................... 426/599; 426/478; 426/489; 426/492; 426/521; 426/590

(58) Field of Classification Search ................ 426/617, 426/590, 599, 478, 489, 492, 521
See application file for complete search history.

(56) References Cited

U.S. PATENT DOCUMENTS

| 4,874,606 A | 10/1989 | Boyle et al. |
| 5,114,723 A * | 5/1992 | Stray-Gundersen .......... 426/74 |
| 5,681,569 A | 10/1997 | Kuznicki et al. |
| 6,033,713 A | 3/2000 | Sheldon |
| 6,162,471 A | 12/2000 | Sheldon |
| 6,485,764 B1 | 11/2002 | Robergs et al. |

FOREIGN PATENT DOCUMENTS

| BR | PI 0006476-3 | 6/2002 |
| BR | PI 0205553-8 | 8/2003 |

* cited by examiner

Primary Examiner—Helen Pratt
(74) Attorney, Agent, or Firm—Richard M. Goldberg

(57) ABSTRACT

A natural re-hydrating and energizing beverage based on coconut water, fruit juices and incorporated nutritive components, to produce a natural isotonic beverage with a striking or gasified aspect in a mixture of coconut water, concentrated fruit juices (pineapple, passion fruit and lemon) and components that confer and/or incorporate energetic and vitamin characteristics as well being gasified by means of direct injection of $CO_2$ into a basic syrup of the product itself that is already formulated, as well as the addition of mineral salts, vitamins and stimulant extracts.

20 Claims, No Drawings

NATURAL RE-HYDRATING AND ENERGIZING BEVERAGE BASED ON COCONUT WATER, FRUIT JUICES AND INCORPORATED NUTRITIVE COMPONENTS

BACKGROUND OF THE INVENTION

The present invention relates to natural re-hydrating and energizing beverages, and more particularly, is directed to a gasified or non-gasified natural beverage and its respective obtainment process formulated from coconut water with fruit juices, which may be also presented as basic syrup diluted in gasified or non-gasified drinking water.

Within this same context one may find coconut water from unripe coconuts as a natural electrolyte replacement that in recent years has shown an increase in consumption, achieving a percentage over 1.5% in relation to artificial soft drinks according to the Coconut Producers Union in Brazil (SINDICOCO).

Several requests for patent protection regarding industrial processes has arisen, ranging from the use of simple methods of extraction and pasteurization of coconut water in plated heat exchangers, to the use of combined methods and refrigeration, to preservation of product qualities by means of micro-filtration and ultra-filtration techniques, as well as in gasified form under a patent in England. However, these patents concern the preservation of coconut water as a beverage for replacing electrolytes and as an isotonic beverage, although it is not natural since it does not have the same osmolarity as blood plasma, thus only replacing mineral salts.

SUMMARY OF THE INVENTION

Therefore, through this invention, the inventor developed a natural re-hydrating and energizing beverage, presented as a suave and refreshing beverage from an industrial obtainment process using development technology of a natural beverage based on coconut water and fruit juices. Basically it includes the development, on an industrial scale, of the beverage formulated with a balanced proportion of coconut water, clarified or non-clarified pineapple juice, lemon juice, adjustment of total sugar and acid content and the incorporation of $CO_2$ in order to obtain a refreshing flavor and a gaseous aspect in the final product, which may contain between 20–70% coconut water, 2–30% pineapple juice and between 2–10% lemon juice, depend on the degree of the final flavor desired. The final product has a limpid, semi-opaque aspect with a flavor characteristic of mixing these three fruits, accentuated by the presence of $CO_2$ that gives a "striking" or "bubbly" characteristic to soft drinks and artificial isotonic beverages present in the international market.

The product technology is based on the use of diverse treatments together with the intention of developing a product with the same flavor and aroma characteristics of the three fruits used, however, with a constant flow of $CO_2$ bubbles. The aforementioned product is a new modality of fruit beverage, differentiated from coconut water in natura by the fact that it is gasified, formulated with concentrated or non-concentrated juices that are clarified or non-clarified and with adjustment of the parameters for sweetness and acidity and perhaps some ingredients such as mineral salts, amino acids, energizing agents and plant extracts. The intention is to give coconut water a differentiated characteristic that in addition to being nutritive offers the pleasure of a sensation in the mouth of a flow of $CO_2$ over the gustatory papillae.

The basic principle is that of making a mixture in which the coconut water is pasteurized, which gives a determining coconut flavor and the concentrate giving the flavor of the fruits used (pineapple, passion fruit and lemon).

The natural re-hydrating and energizing beverage based on coconut water, fruit juices and incorporated nutritive components is considered to be a product derived from coconut water, with a specific denomination and having coconut water nutrients proportional to the percentage of coconut water in the final mixture.

The use of carbonic gas, in addition to giving a "striking" flavor, also substantially reduces the activity of oxidizing enzymes in coconut water. This fact is based on the expulsion of oxygen at the time of incorporating carbonic gas, which together give a more acidic flavor due to the action of carbonic acid formation from the interaction of the water and dissolved carbonic gas.

Gasification of the final product is achieved in a carbonation system, which may be of the continuous or non-continuous type and of conventional use in the artificial gasification of wines, soft drinks and other carbonated beverages through the method direct injection of $CO_2$.

The product natural re-hydrating and energizing beverage based on coconut water, fruit juices and incorporated nutritive components is characterized by its presentation as a translucent liquid with a natural pineapple and lemon aroma and flavor, mixed together with coconut water and saturated with carbonic gas up to levels of 1.0 to 4.0 volumes of $CO_2$.

Due to the characteristics of this line of products, artificial isotonic beverages, soft drinks and coconut water, this request for patent protection for the industrial product/process also claims the "energizing" versions—with the addition of stimulating components (amino acids, guaraná extract, caffeine, taurine and other stimulants of this type) as well as mineral salts such as calcium, iron, magnesium, potassium and phosphorus, becoming a product of those types including artificial energizing and isotonic beverages sold throughout the world, with the advantage of being natural.

After formulating the natural re-hydrating and energizing beverage based on coconut water, fruit juices and incorporated nutritive components it should be maintained at low temperatures until it is sent to the carbonation unit and sent to the final product-bottling sector. It also may be sold in concentrated syrup form, in which the bottling plant may be quite distant and may receive such syrup with all of the ingredients for the addition of only the gasified water and be bottled and sold, thus avoiding transportation of water between distant regions.

Also included in this request for invention privileges is the technology for developing the basic syrup concentrate for the natural re-hydrating and energizing beverage based on coconut water, fruit juices and incorporated nutritive components, considering this product to be an intermediary product in producing the final soft drink. Formulation of the aforementioned syrup follows the methodology explained in the example presented herein, in which are presented all of the stages of the production process.

Therefore, the request for protection of the technology and formulations regarding the natural re-hydrating and energizing beverage should protect such product and its obtainment process in order that it may become one more technology available for the agribusiness sector for coconuts and derivative products.

The products natural re-hydrating and energizing beverage based on coconut water, fruit juices and incorporated nutritive components and syrup concentrate for the natural re-hydrating and energizing coconut water beverage are included in a single request, since both in the end and at the time of consumption are a single product, the natural re-hydrating and energizing coconut water beverage, with the flavors of coconut water, pineapple, passion fruit and lemon combined and balanced as a suave and refreshing beverage.

Considering that coconut water contains an enzymatic system highly resistant to increasing temperatures and an excellent capacity for regeneration after applying thermal treatments, without the occurrence of significant alterations in its flavor or aroma, this patent is requested in order to protect a process developed for a biochemical stabilization through thermal treatment in a pasteurizer and the addition of gas for oxygen expulsion by $CO_2$ "stripping" by means of carbonation. The product thus obtained has a shelf life of 6 (six) months to one year and preservatives may be added pursuant to the Codex Alimentárius legislation for carbonated beverages, isotonic beverages and energizing soft drinks.

The invention may be better understood by means of the following detailed description in accordance with the example presented herein.

DETAILED DESCRIPTION

In formulating the natural re-hydrating and energizing coconut water beverage and the syrup concentrate the following components may or may not be present: mineral salts such as calcium, magnesium, phosphorous, potassium, iron and sodium; vitamins in the B complex, ascorbic acid, vitamins A, D, E and K; and guaraná, caffeine and taurine extracts (for the energizing versions). The following stages explain the process phases:

Obtainment of coconut liquid: In this stage, after selection, the coconuts are washed in accordance with good production practices (BPFs) employed in the fruit juice industry. In this phase manual and/or mechanized extraction processes are employed, with later filtration of the product obtained in line filters in order to achieve a homogenous product without undesirable materials in suspension.

Vacuum Concentration: The coconut water obtained in this stage (a) is concentrated up to a reduction in weight/volume of 1.5 to 5 times its initial volume. In the phase, the coconut water obtained is concentrated between 8 and 50°Brix, with 100% replacement of its characteristics after re-diluting in drinking water. The concentration operation is performed in vacuum equipment of the descending-membrane type, scraped surface, copper boiler of the "bulher" type or by atomization.

Formulation of the basic syrup: The coconut water concentrate obtained in stage (2) is mixed with pineapple/lemon and/or passion fruit/lemon concentrates, as well as other optional formula components (acidulates, mineral salts, vitamins and stimulants).

Final beverage production: After obtaining the syrup, carbonated water is added or not in a 10–90% proportion for the final beverage formulation. In this stage one obtains the natural re-hydrating beverage based on coconut water and fruit juices. The amount of carbonated water is processed in carbo-cooler equipment at a temperature that varies between 0° and 10° C., having a final carbonic gas content between 1.0 and 4.0 volumes of $CO_2$.

Final beverage storage: After obtaining the final beverage it may be maintained at room temperature or also refrigerated during a period between six (06) months.

What is claimed is:

1. A process for producing a natural re-hydrating and energizing beverage based on coconut water and fruit juices, including the steps of:
    a) extracting coconut water from washed and sanitized coconuts;
    b) filtering said coconut water resulting from step (a) in line filters in order to eliminate undesirable components in suspension and;
    c) pasteurizing the coconut water;
    d) concentrating the material resulting from step (c) up to an amount that varies between 1.5 to 10 times an initial volume of coconut water filtered as a result of step (b) to produce a concentrated coconut water;
    e) mixing the concentrated coconut water of the step d) with concentrated juices to formulate a beverage; and
    f) filtering the beverage of step e) in liquid phase in order to eliminate fiber particles to provide a concentrated filtered beverage that provides stability of color and organoleptic properties of fruits used in a final composition of the natural re-hydrating and energizing beverage based on coconut water and fruit juices.

2. A process for producing a natural re-hydrating and energizing beverage according to claim 1, wherein ingredients of said beverage have with no prior concentration of components, thus being produced in a continuous scale within a coconut water extraction and bottling plant.

3. A process for producing a natural re-hydrating and energizing beverage according to claim 1, further comprising the step of directly injecting carbonic gas into the beverage so that the beverage is produced in a gasified form.

4. A process for producing a natural re-hydrating and energizing beverage according to claim 1, wherein the beverage is produced in a non-gasified form.

5. A process for producing a natural re-hydrating and energizing beverage according to claim 1, further comprising the step of adding at least one of:
    a) mineral salts, and
    b) vitamin complexes selected from the group consisting of vitamins complexes B, A, D, E, K and ascorbic acid, such that ascorbic acid can be added and to act as a natural anti-oxidant substance.

6. A process for producing a natural re-hydrating and energizing beverage according to claim 1, further comprising the step of performing pH and acidity adjustments to the beverage by adding organic acids in order to reach an ideal pH for conservation of a pasteurized product.

7. A process for producing a natural re-hydrating and energizing beverage according to claim 6, wherein the organic acids are selected from the group consisting of citric, ascorbic, lactic and tartaric acids.

8. A process for producing a natural re-hydrating and energizing beverage according to claim 1, further comprising the step are selected from the group consisting of adding concentrated juices of pineapple, lemon, passion fruit and guaraná vegetable extracts and infusions of medicinal plants.

9. A process for producing a natural re-hydrating and energizing beverage according to claim 1, further including the step of adding flavors for maintaining a coconut water flavor.

10. A process for producing a natural re-hydrating and energizing beverage according to claim 1, further comprising the step of adding substances in order to maintain at least one of physical, chemical and biological stability of the final product.

11. A process for producing a natural re-hydrating and energizing coconut water based on coconut water and fruit juices, including the steps of:
  a) extracting coconut water from washed and sanitized coconuts by one of mechnical and manual operation;
  b) filtering said coconut water resulting from step (a) in line filters in order to eliminate undesirable fibers in suspension and to produce a beverage therefrom;
  c) pasteurizing the coconut water;
  d) concentrating the beverage resulting from step (b) up to a concentration that varies between 1.5 to 10 times an initial volume of coconut water filtered as a result of step (b) to produce a concentrated coconut water;
  e) mixing the concentrated coconut water of step d) with concentrated juices to formulate a beverage;
  f) formulating of a base syrup from the concentrated coconut water, concentrated fruit juices and of natural fruit aroma; and
  g) filtering the base syrup in order to eliminate fiber particles to allow stability of color and organoleptic properties of fruits and coconut water used in a final composition of the natural re-hydrating and energizing beverage based on coconut water and fruit juices.

12. A process for producing a natural re-hydrating and energizing beverage according to claim 11, wherein the concentrated fruit juices selected from the group consisting of pineapple, passion fruit, guaraná and lemon.

13. A process for producing a natural re-hydrating and energizing beverage according to claim 11, further comprising the step of directly injecting carbonic gas into the beverage so that the beverage is produced in a gasified form.

14. A process for producing a natural re-hydrating and energizing beverage according to claim 11, wherein the beverage is produced in a non-gasified form.

15. A process for producing a natural re-hydrating and energizing beverage according to claim 11, further comprising the step of adding at least one of:
  a) mineral salts, and
  b) selected from the group consisting of that may include vitamin complexes B, A, D, E, K and ascorbic acid, such that ascorbic acid can be added to act as a natural anti-oxidant substance.

16. A process for producing a natural re-hydrating and energizing beverage according to claim 11, further comprising the step of performing pH and acidity adjustments to the beverage by adding organic acids in order to reach an ideal pH for conservation of a pasteurized product.

17. A process for producing a natural re-hydrating and energizing beverage according to claim 16, wherein the organic acids selected from the group consisting of citric, ascorbic, lactic and tartaric acids.

18. A process for producing a natural re-hydrating and energizing beverage according to claim 11, further comprising the step selected from the group consisting of adding concentrated juices of pineapple, lemon, passion fruit and guaraná vegetable extracts and infusions of medicinal plants.

19. A process for producing a natural re-hydrating and energizing beverage according to claim 11, further including the step of adding flavors for maintaining a coconut water flavor.

20. A process for producing a natural re-hydrating and energizing beverage according to claim 11, further comprising the step of adding substances in order to maintain at least one of a physical, chemical and biological stability of the final product.

* * * * *